INVENTORS
John P. Woods
Tom Prickett Jr.
William M. Mullings
James K. Lyons

ATTORNEY

3,268,910
TRANSDUCER INDEXING SYSTEM FOR PLAYING BACK VARIOUS GEOPHYSICAL RECORDINGS
John P. Woods, Dallas, Tom Prickett, Jr., Richardson, William M. Mullings, Garland, and James K. Lyons, Dallas, Tex., assignors to The Atlantic Refining Company, Philadelphia, Pa., a corporation of Pennsylvania
Original application Feb. 25, 1964, Ser. No. 348,322, now Patent No. 3,210,770, dated Oct. 5, 1965. Divided and this application Nov. 17, 1964, Ser. No. 417,531
4 Claims. (Cl. 346—139)

This invention relates to a playback system suitable for use with a field or office type geophysical recorder or computer. More specifically, the invention relates to an improved transducer indexing system designed to reproduce seismic records in accordance with requirements peculiar to hydrocarbon exploration and interpretation.

The present case is a divisional application of application Serial No. 348,322 (filed February 25, 1964) now Patent No. 3,210,770 which application is in turn a continuation application of application Serial No. 99,858 (filed March 31, 1961), now abandoned.

Magnetic recording has been known and utilized for many years; and since World War II, the use of magnetic recording in geophysical exploration has increased at an impressive rate. However, in spite of the rapid increase in the use of magnetic recording in this field, to date no satisfactory recorder-playback combination capable of meeting the peculiar requirements of hydrocarbon exploration has been invented. In the seismic field of geophysical exploration numerous devices are used in an attempt to furnish a field recorder operator with a high speed economical, and satisfactory visual check or monitoring apparatus for determining the success of the magnetic recorder in capturing seismic reflections in readable form. With a proper monitoring apparatus the operator can quickly determine after each firing if the recordings are satisfactory. If one or more of the channels are not recorded in a readable form, a second shot or series of shots can be fired before the party moves on to its next location. By using the proper monitoring means, the party is able to save thousands of dollars in time, explosives, etc., that would normally be required in "reshooting" positions at later dates. Various display or monitoring systems are used today in conjunction with magnetic recorders to check the readability of recorded signals. Photographic oscillographs, fluorescent screens, and various types of recording pen systems are common devices for providing a visual check of magnetic recording. Probably, one of the most satisfactory answers to the basic monitoring requirement is found in United States Patent No. 2,803,515. This patent discloses a magnetic field recorder and playback combination that simultaneously records a number of seismic signals and thereafter, for monitoring purposes, sequentially, channel by channel, transcribes the recorded seismic signals on Teledeltos paper. The device may be made to repeat the reproduction of any channel by actuating a repeat switch or may be made to return to the start position by actuating a manual reset button. Although the patent provides a satisfactory basic field recording and playback combination, it is not versatile enough to meet the over-all requirements of hydrocarbon exploration. Since this type of exploration is highly specialized and complex, the modified conventional type playback or transcribing system as discussed above is not satisfactory. Due to the peculiar requirements of this specialized type of exploration, a desirable playback apparatus, in addition to affording a visual monitoring means, must also provide some type of control means designed to present the transcribed information in a manner suitable for the particular purpose for which the information is to be used. Ideally, this apparatus should also be versatile enough to be used with either a field recorder where the transcribing drum is approximately 8 to 12 inches in length or with a central office computer where the drum is from 4 to 5 feet in length. This extreme variation in drum length imposes severe requirements of flexibility on the pen indexing portion of the playback combination.

First, with reference to the control means requirements mentioned above, it is highly desirable in all hydrocarbon exploration and interpretation operations, and mandatory in some, that the apparatus be versatile enough to (1) be able to select the recorded channels to be transcribed, (2) be able to adjust the width of the transcribed channels, (3) be able to adjust the distance between the edge of the transcribing medium and the first transcribed channel, (4) be able to provide a center gap or an area on the transcribing medium for noting seismic information and computations, (5) be able to adjust the center gap as to width and location, and (6) be able to start and stop the transcribing apparatus at any desired location. The above versatility is utilized, all or in part, either in the field to aid the monitoring operations or in an installation to aid record interpretation operations. The operator in the field, in addition to utilizing the monitoring and control means to check recording quality, uses it to determine the type and quality of filtering required to overcome noise and interference inherent in the area being surveyed. The magnetic channels that he desires to monitor or the number of geophones used in the particular survey will, in most cases, dictate the recorded channels to be transcribed, the width of the edge gap, the width and location of the transcribed channels and the width and location of the center gap. The use of such a versatile playback system is even more essential when the magnetic recordings are utilized in a computer installation. Here, the playback system is used for such operations as transcribing new records received from the field, refiltering the new records, transcribing and refiltering for comparative purposes old records taken in the same area or similar areas, transcribing new or old logs made in the same area, and presenting desired combinations of the above information on the same playback medium for correlation purposes. In accordance with the studies to be made, the different records to be used, and the number of channels to be transcribed, the width of the edge gap, the width of the transcribed channel, and the location and width of the center gap are determined. In addition to the above types of presentation, the playback system must also be able to change previously recorded exploration data into cross sections of the areas previously explored.

In summary, it is obvious that a playback system satisfactory for hydrocarbon exploration and interpretation purposes cannot be one limited to transcribing seismic data in a stereotype form. This is especially true since it is frequently desirable to transcribe seismic information, appropriately recorded well logging information, as well as other types of exploration information, on the same medium so that visual or automatic correlations between the different information can be made. Therefore, a satisfactory playback system must be versatile enough (1) to accommodate itself to operate on various types of recorded information and (2) to transcribe the information in the form that will facilitate interpretating the particular information transcribed.

It is, therefore, an object of this invention to provide a versatile automatic playback system usable with either a field recorder or office computer which incorporates controls so that the transcription can be made in a form suitable to the interested party's needs.

Another object of the invention is to provide an automatic playback means capable of transcribing various types of previously recorded hydrocarbon exploration information in a form best suited to facilitate interpretation of the information.

Another object of the invention is to provide a compact, transportable, and rugged playback unit capable of being utilized either in the field or in an office.

Another object of the invention is to provide a simplified playback system exhibiting a minimum of moving parts and adapted to provide fast accurate records and dependable service under field conditions.

Another object of the invention is to provide a read and/or write element indexing system capable of operating across a computer drum or a field recorder drum.

Another object of the invention is to provide a read and/or write element indexing system that is simple and dependable in operation with a minimum of moving parts.

Another object of the invention is to provide a read and/or write element indexing, clutch-brake assembly adapted to prevent servo-hunt, jitter, backlash, etc., and capable of accurate operation over a long drum or wide chart.

Another object of the invention is to provide a simplified read and/or write element indexing system with a faster response time and more accurate positioning system than heretofore available.

Another object of the invention is to provide a read and/or write element indexing system that is adapted to simultaneously operate one or more read and/or write element housings.

Another object of the invention is to provide a read and/or write element indexing system that is adapted to simultaneously move two or more housings in the same or opposite directions, as desired.

Briefly stated, the preferred form of the invention is concerned with an automatic playback system which utilizes a novel incremental motion type indexing device adapted to operate with a monitor transcriber for a magnetic field recorder or with a transcriber for a large, office type computing device. The novel indexing device is designed for minimum physical wear and simplicity of operation so that it can function in the field or in the office with a minimum of maintenance.

Within the broad statements of the invention as given above, there are numerous combinations and subcombinations of apparatus which are in themselves novel and which will be so recognized.

Figure 1:
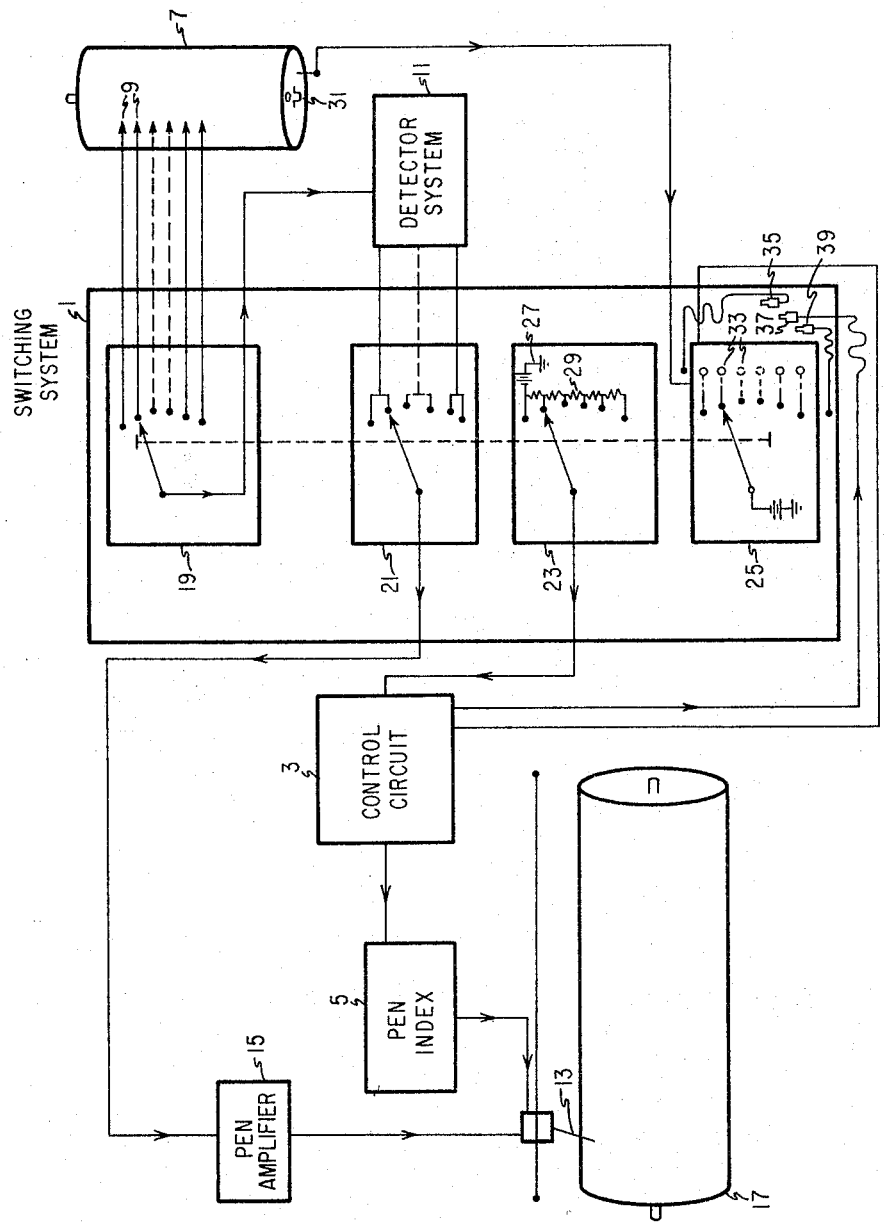
FIGURE 1 is a simplified diagram of a playback system.

FIGURE 1 is a schematic diagram of one possible combination of applicants' invention and conventional recording and transcribing devices. Applicants' invention is shown as pen indexing system 5 associated with playback switching system 1, playback switching control circuit 3, magnetic recording drum 7, magnetic heads 9, detector system 11, transcribing pen 13, pen amplifier 15, and transcribing drum 17.

A further and more detailed description of this embodiment follows.

The basic function of switching system 1 is to automatically and selectively connect read and write means so that previousyy recorded data are automatically transcribed as directed by instructions set in associated control means 3. The basic function of control means 3 is to command indexing system 5 to position transcribing element 13 so that it reproduces the data in a preselected manner compatible with requirements peculiar to hydrocarbon exploration and interpretation activities. Control means 3 may physically be a part of or separate from switching system 1.

Playback switching matrix 1, FIGURE 1, is shown as a number of ganged sequential multicontact switches 19, 21, 23 and 25. Multicontact switch 19 connects magnetic heads 9 to detector system 11. Multicontact switch 21 connects an output of detector 11 to the input of pen amplifier 15. Multicontact switch 23 connects a voltage source 27 through a resistor system 29 and control circuit 3 to the input of pen indexing means 5. The pen index may include a servo mechanism, a motor drive mechanism, or a simple circuit connected to the device depending upon the type of pen index used. Switch 25 is connected to ramp switch 31 on magnetic recording drum 7 and is designed to be pulsed by each revolution of the drum. Each time switch 25 is pulsed by switch 31, the next succeeding contact on the switch is closed, thus moving 25 and its ganged switches 19, 21 and 23 to their next succeeding contacts. Switch 25 contains receptacles 33 for start patch plug 35, center gap plug 37 and stop plug 39. As will be explained in detail hereinafter, the proper connection of plugs and receptacles bridges the undesired switch contacts and locates the desired center gap on transcribe drum 17.

Control circuit 3 converts preset transcribing instructions into proper command voltages for the pen index system. As will be detailed hereinafter, the type of pen index used determines the type of control circuit required. If a pulse type indexing device is used, the control system can be a simple circuit connecting a pulse circuit, such as switch 23, FIGURE 1, to the pen index. Of course, necessary relays and patch cords connections or the like are required, as described hereinafter, to avoid the undesired channels.

Operation of the playback switching matrix and control circuit in FIGURE 1 is as follows. Prior to the playback, the desired transcribe instructions are set in the control circuit. Start plug 35, center gap plug 37, and stop plug 39 are placed in the appropriate receptacles 33. The plug positions determine the magnetic channels to be replayed and the position of the center gap, as will be described in more detail in the matrix subheadings. Any or all of the above instructions may be varied after each transcribing operation or may be retained as long as appropriate.

After the desired adjustments have been made on the control circuit and patch board, the system is then ready for a fire-record-transcribe sequence or a transcribe sequence, depending on the purpose of the playback and the type recorder being used. Assuming that the desired information is already recorded on drum 7, the playback sequence is as follows. The proper magnetic head 9 is selected by the position of switch 19 which in turn is determined by switch 25 and the receptacle 33 in which start plug 35 is inserted. The magnetically recorded intelligence under the selected head is read out and sent through detector systems 11, switch 21, playback amplifier 15 to playback pen 13, where it is transcribed on a medium mounted on drum 17. During this operation, switch 23, which was simultaneously positioned along with 19 and 21, connects D.C. voltage 27 to control circuit 3 where a command voltage is developed. This command voltage causes pen index 5 to position playback pen 13 over an appropriate transcribe channel on drum 17. As playback pen 13 completes the transcription of the selected magnetic channel, drum 7 completes a single revolution causing pen shift ramp switch 31 to close producing a D.C. pulse. The D.C. pulse causes switch 25 to move to its next succeeding contact. If the succeeding contact is bridged by center gap plug 29, the next selected contact is activated. Since switch 25 is ganged to 19, 21 and 23, the appropriate contact on each switch is activated and the recorded information from the next selected magnetic head is transcribed on drum 17. This operation is repeated until the contact on switch 25, selected by stop plug 39, is energized. At that time, the D.C. pulse from the recording drum is short-circuited to ground, all switch contacts are cleared, and the playback sequence is complete.

The pen indexing device 5, FIGURE 1, is designed to position playback pen 13 over the appropriate transcribe channel on drum 17, as directed by the playback switching matrix 1 and control circuit 3. The type of control circuit used depends on the type of indexing device utilized. If it is desirable to use a servo-driven indexing device, a control circuit is used to develop a command voltage to operate the pen index. As will be detailed hereinafter, the command voltage can be used to operate the servo in novel incremental steps or the command voltage can be compared with a second voltage to produce an error signal to operate a conventional servo indexing system. If the pen indexing mechanism is not servo-driven, the control circuit is modified accordingly. The novel pen indexing mechanisms to be described hereinafter are not limited in their operation and can be used on a field recorder or an office computer with equal accuracy. In addition, they are well suited for automatic, semiautomatic or manual operation, with or without a switching matrix. Although the index mechanisms are illustrated and described as pen indexing devices, it should be understood that if desired they can be used to position any type of read and/or write transducer or transducers to include magnetic heads, electric pens, ink pens, optical readout systems, etc.

Heretofore, most pen indexing systems have used servo-operated lead screws to position a read or write element over a desired portion of a drum or chart. The servo was operated by a conventional error voltage and rotated the lead screw until the error voltage was zero. It is well-known that when such a servo mechanism is required to operate over a considerable linear distance the system loses much of its accuracy. In fact, when a conventional servo indexing device is used to move a pen housing over a distance greater than 12 inches, the problem of inaccurately located playback channels, etc., becomes serious. Applicants' novel invention has solved this problem by developing pen indexing devices capable of operating over distances much greater than 12 inches and still retaining a high degree of accuracy in locating the playback channels. Applicants' pen indexing devices, when operating over long drums, utilize an incremental stepping system which retains the high degree of accuracy inherent in a servo system operating over a few inches, and yet reduces the response time of such a system by a factor of two or three, depending on the particular species used. This feature will be explained in detail hereinafter. In addition to maintaining accuracy and reducing response time, applicants' devices overcome the problems of jitter, backlash, and servo-hunt by the use of a novel brake and clutch arrangement.

*Multi-pen indexing device*

Figure 2:
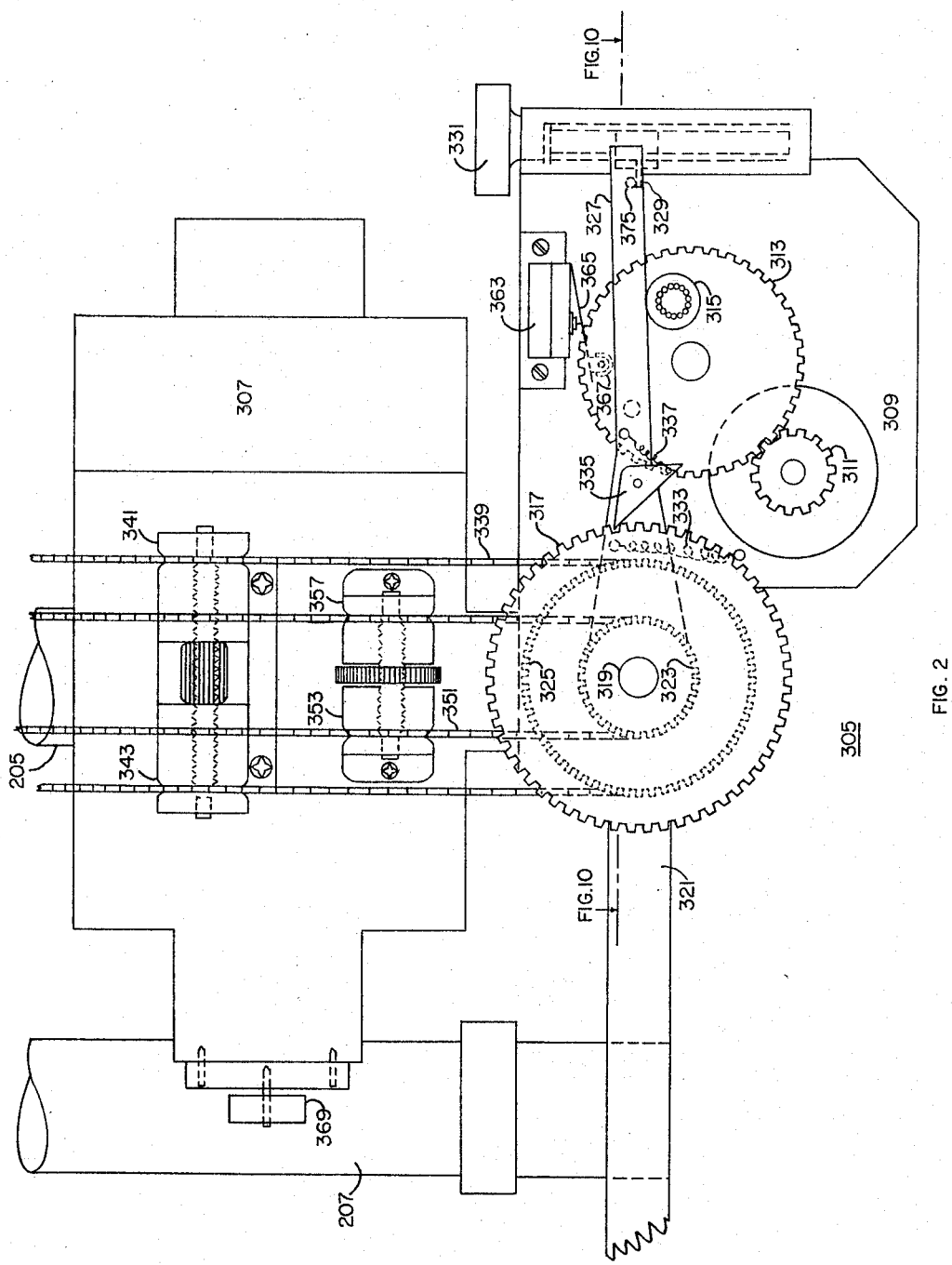
FIGURE 2 is a top view of a driving portion of a multi-read and/or multi-write element indexing device.
Figure 3:
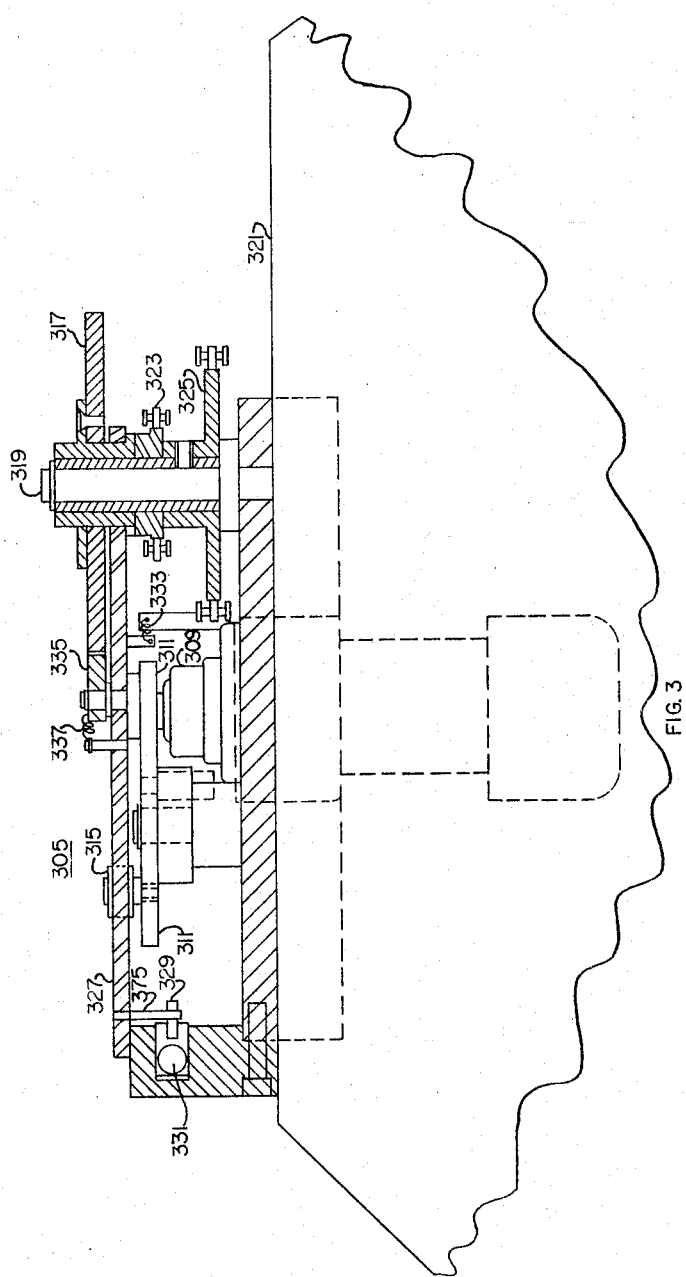
FIGURE 3 is a side view, in section, of the driving device shown in FIGURE 2.
Figure 4:
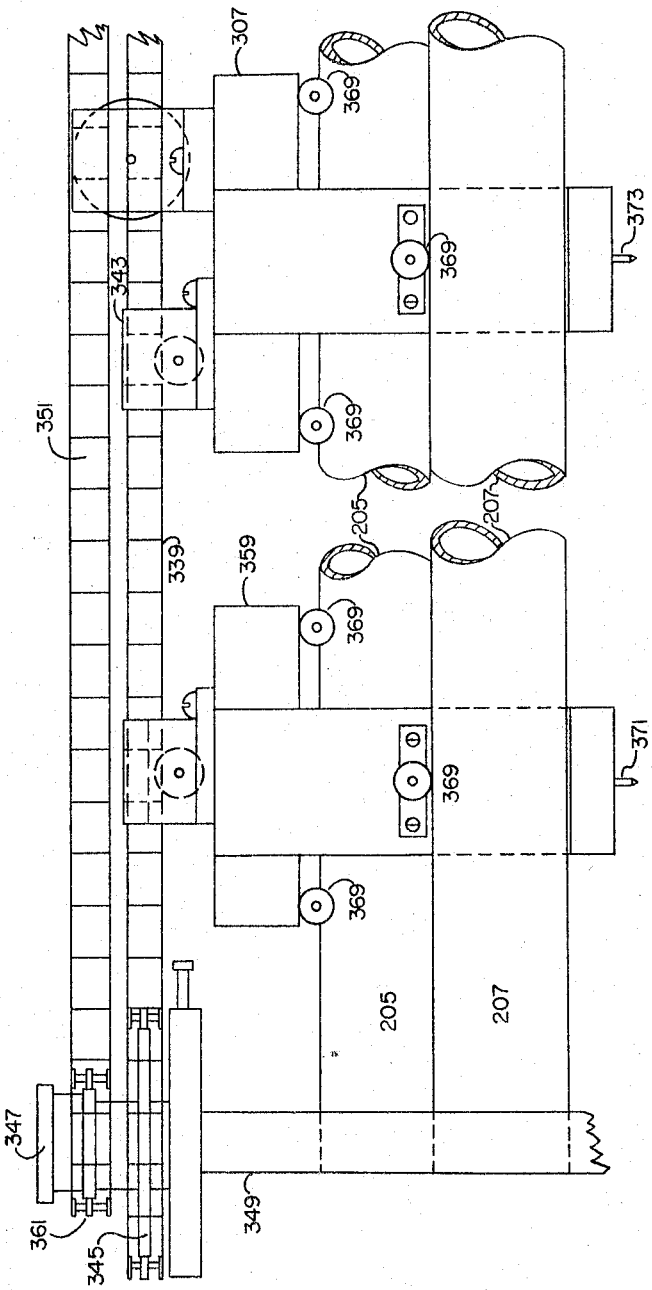
FIGURE 4 is a front view of the multi-read and/or multi-write element indexing device with the driving portion omitted.

FIGURES 2, 3 and 4 show a novel multi-pen indexing device capable of simultaneously recording a variable density or area cross section and a conventional wiggle line cross section. FIGURE 2 shows a top view of the device's driving unit and one pen housing unit. FIGURE 3 shows a side view, in section, of the driving unit. FIGURE 4 shows a front view of both pen housings, their respective ladder chains and idler sprockets. The indexing system is designed so that the distances between the two pen housings can be adjusted and so that one or both pen housings can be indexed, in discrete steps, across the length of the recording drum. If desired, the two housings can be positioned to start recording from opposite ends of the drum and move toward each other in discrete steps. In spite of the system's versatility, its simple and rugged construction is such that only a minimum of maintenance is required.

Referring now to FIGURES 2 and 3, one sees driving unit 305 and one pen housing 307 of the multi-pen indexing device. Driving unit 305 includes a small gear head D.C. motor 309, mounting a 44-tooth pinion 311 which meshes with a 112-tooth gear 313. A small ball-bearing roller 315 is mounted off-center on top of gear 313. A 240-tooth gear 317 is mounted on spindle 319 which is attached to recorder housing frame 321. Driven sprockets 323 and 325 are mounted under gear 317 and on a bushing surrounding spindle 319. Actuating arm 327 is rotatably mounted on spindle 319 and positioned between gear 317 and sprocket 323 to extend across gear 313 and contact stop 329. Stop 329 can be positioned by manually controlled micrometer lead screw 331. Actuating arm 327 is biased by spring 333 so that it is held against ball-bearing roller 315. Ratchet pawl 335 is mounted on actuating arm 327 and spring-loaded by spring 337 so that it engages the teeth of gear 317. Ladder chain 339 is mounted on sprocket 325 and extends through grippers 341 and 343 of pen housing 307 and around idler sprocket 345, FIGURE 4, mounted on spindle 347 anchored to computer frame 349. Ladder chain 351 extends through grippers 353 and 357 or pen carriage 307, passes over pen carriage 359 and around idler sprocket 361 mounted on spindle 347 anchored to frame 349, FIGURE 4. Microswitch 363, FIGURE 2, is mounted on computer frame 321 so that switch contact 365 strikes projection 367 mounted on gear 313. Pen housings 307 and 359, FIGURE 4, are designed to move over tubular ways 205 and 207, connecting computer frame 321, FIGURE 2, and 349, FIGURE 4. Pen housings 307 and 359 move over ways 205 and 207 on wheels 369. The recording drum, not shown, is positioned under writing elements 371 and 373.

In operation, the pen housings are positioned, the selected grippers are tightened against the selected ladder chains to develop the desired directions of movement and the actuating arm stroke distance is set on the micrometer 331. A command pulse from the switching matrix pulse circuit, FIGURE 1, closes a relay, not shown, and powers motor 309, FIGURE 2, rotating gear 311 until gear 313 completes one rotation. As gear 311 drives gear 313 through one rotation, ball-bearing projection 315 displaces actuating arm 327 forcing spring-loaded pawl 335 to rotate gear 317. Projection 367 on gear 311 strikes contact 365 and causes microswitch 363 to cut off motor 309 after one rotation of gear 313. During the rotation of 313 and after projection 315 has pushed actuating arm 327 to its maximum displacement, spring 333 returns the actuating arm until projection 375 on 327 strikes stop 329 on micrometer 331. Thus, the position of stop 329 as determined by micrometer 331 controls the number of ratchet teeth on gear 317 advanced by each pulse. Ratchet pawl 335 is lightly spring loaded so that friction is sufficient to prevent rotation of gear 317 in the reverse direction during the return stroke of the actuating arm. During the period when actuating arm 327 imparts movement to gear 317 and to its spindle 319, linear motion is transmitted to ladder chains 339 and 351 by their respective sprocket gears 325 and 323. Pen housings 307 and 359, FIGURE 4, are thus moved in discrete steps across the recording drum. The amount and direction of movement imparted to each pen housing is determined by the actuating arm stroke setting of micrometer 331, the diameters of sprockets 325 and 323 and by the gripper used to secure each of the pen carriages to its ladder chain. Additional pen housings can be used by adding additional sprockets and ladder chains and adjusting the additional grippers so that they accommodate the ladder chains.

While there have been disclosed herein several specific preferred embodiments of the present invention, various modifications, omissions and refinements which depart from the disclosed embodiments may be adopted without departing from the spirit and scope of the present invention which is limited only by the following claims.

What is claimed is:
1. A multi-pen indexing device comprising
 (a) a frame member with opposing ends,
 (b) supporting means crossing said frame member from end to end,
 (c) at least two pen housings movably mounted on said supporting means,
 (d) at least one pen carried by each of said pen housings,
 (e) corresponding sprocket arrangements mounted on spindles at each end of said frame member,
 (f) one continuous chain mounted across said frame member on said sprocket arrangements for each of said pen housings,
 (g) gripper means attached to each of said pen housings for engaging the continuous chain associated with said housing,
 (h) a driven gear mounted on one of said spindles,
 (i) an actuating arm rotatably mounted on the spindle to which said driven gear is attached,
 (j) a ratchet pawl mounted on said actuating arm for engaging said driven gear,
 (k) a driving gear means including an off-center roller which acts to displace said actuating arm, and
 (l) a motor for operating said driving gear means.
2. A device as set forth in claim 1 in which each of said sprocket arrangements includes a series of concentric sprockets.
3. A device as set forth in claim 1 in which a projection on said driving gear actuates a microswitch which controls said motor.
4. A device as set forth in claim 1 in which a spring member holds said actuating arm against the roller on said driving gear means.

References Cited by the Examiner
UNITED STATES PATENTS

| | | | |
|---|---|---|---|
| 1,163,280 | 12/1915 | Stevens | 346—33 X |
| 2,000,046 | 5/1935 | Stevens | 346—114 X |
| 2,037,409 | 4/1936 | Duvander | 346—49 X |
| 2,387,563 | 11/1945 | Chapple | 346—49 |
| 2,612,430 | 9/1952 | Heidi et al. | 346—114 X |
| 2,626,979 | 1/1953 | Woods | 346—139 X |
| 2,764,464 | 9/1956 | Morton et al. | 346—114 X |

LOUIS J. CAPOZI, *Primary Examiner.*

LEO SMILOW, LEYLAND M. MARTIN, J. W. HARTARY, *Assistant Examiners.*